United States Patent [19]
Hashmi et al.

[11] Patent Number: 5,858,237
[45] Date of Patent: Jan. 12, 1999

[54] HYDROCYCLONE FOR SEPARATING IMMISCIBLE FLUIDS AND REMOVING SUSPENDED SOLIDS

[75] Inventors: Khalid A. Hashmi; Hassan A. Hamza; Wally I. Friesen; Kanti L. Kar, all of Edmonton, Canada; Martin T. Thew, Bitterne, United Kingdom

[73] Assignee: Natural Resources Canada, Ottawa, Canada

[21] Appl. No.: 848,276

[22] Filed: Apr. 29, 1997

[51] Int. Cl.[6] .......................... B01D 21/26; B01D 17/038
[52] U.S. Cl. .................. 210/512.1; 210/175; 210/512.2; 210/787; 209/11; 209/721; 209/732; 55/459.1
[58] Field of Search ............................. 210/512.1, 512.3, 210/175, 788; 55/459.1, 459.2, 459.3, 459.4, 459.5; 209/715, 721, 11, 725, 732

[56] References Cited

U.S. PATENT DOCUMENTS

| | | |
|---|---|---|
| 3,034,647 | 5/1962 | Giesse . |
| 3,130,157 | 4/1964 | Kelsall et al. . |
| 3,379,308 | 4/1968 | Horiuchi . |
| 3,483,973 | 12/1969 | Jager . |
| 4,235,363 | 11/1980 | Liller ........................ 209/732 |
| 4,722,796 | 2/1988 | Colman et al. . |
| 4,726,686 | 2/1988 | Wolf et al. . |
| 4,820,414 | 4/1989 | Carroll et al. . |
| 4,997,549 | 3/1991 | Atwood . |
| 5,008,014 | 4/1991 | Lloyd et al. . |
| 5,017,288 | 5/1991 | Thew et al. . |
| 5,240,115 | 8/1993 | Crossley et al. ................. 210/512.1 |
| 5,332,500 | 7/1994 | Seureau et al. . |
| 5,336,410 | 8/1994 | O'Brien et al. ................. 210/512.1 |
| 5,501,803 | 3/1996 | Walin . |
| 5,564,574 | 10/1996 | Kuryluk . |
| 5,643,470 | 7/1997 | Amini ........................ 210/512.1 |

FOREIGN PATENT DOCUMENTS

| | | |
|---|---|---|
| 0 313 197 A2 | 4/1989 | European Pat. Off. . |
| 2062764 | 6/1971 | France . |
| 39 36 078 A1 | 5/1991 | Germany . |
| 465897 | 5/1937 | United Kingdom . |
| 2 107 616 | 5/1993 | United Kingdom . |
| WO 91/14492 | 10/1991 | WIPO . |

Primary Examiner—David A. Reifsnyder

[57] ABSTRACT

The invention relates to a cyclone separator for separating oil and water and removing suspended solids. It comprises a generally cylindrical first portion with an open end and a closed end. A generally axial overflow outlet is provided in the closed end and a moveable member is associated with this closed end having a plurality of orifices of progressively smaller diameter than the overflow outlet. This moveable member may be moved such that any selected one of the plurality of orifices may be axially aligned with the overflow outlet. The separator includes at least two radially balanced feed injection ports in the cylindrical first portion adjacent to the closed end thereof. A converging tapered second section with open ends is axially flow connected to the open end of the cylindrical first portion and a converging tapered third portion with open ends is axially flow connected to the tapered second portion. A fourth generally cylindrical portion is axially flow connected to the third tapered portion. This separation is of particular value in heavy oil production.

6 Claims, 3 Drawing Sheets

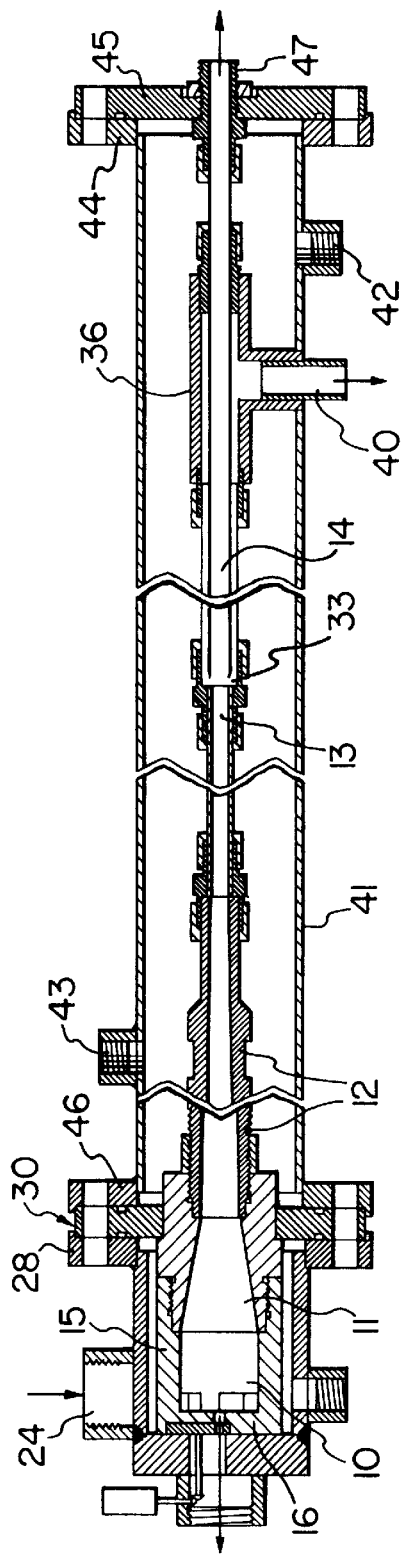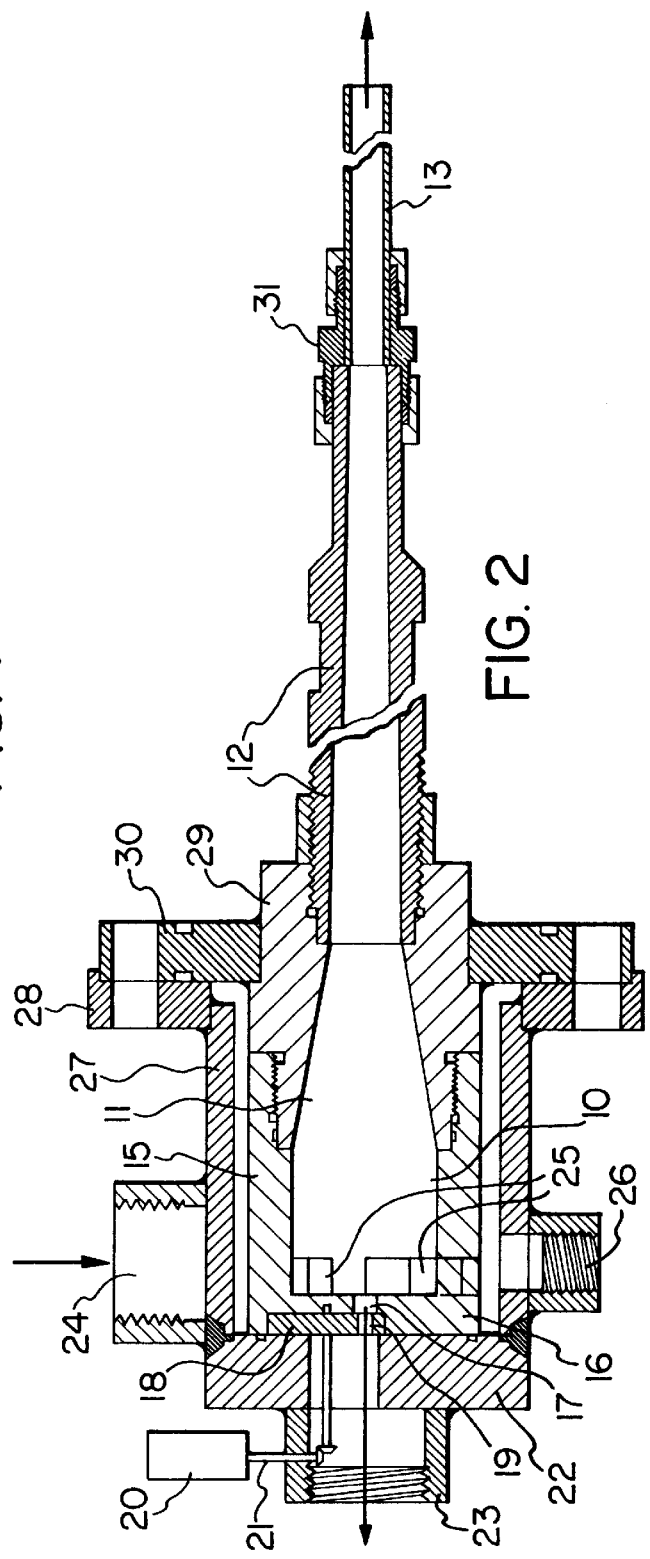

HYDROCYCLONE FOR SEPARATING IMMISCIBLE FLUIDS AND REMOVING SUSPENDED SOLIDS

BACKGROUND OF THE INVENTION

This invention relates to a cyclone separator. It relates more particularly to a hydrocyclone for separating immiscible fluids, e.g. oil and water, and removing suspended solids.

In heavy oil production, it is commonplace for fluids produced at the well head to contain in excess of 70 percent by volume of water, as well as varying amounts of suspended solids. In order to transport and process the oil and safely dispose of or recycle the water, it is necessary to separate these components in an efficient manner.

A variety of different cyclone separators have been developed for this purpose. For instance, Thew et al. U.S. Pat. No. 5,017,288 describes a cyclone separator for removing oil from water having a first cylindrical section followed by a pair of converging funnel shaped sections. The oil is removed through an overflow outlet at a closed end of the cylindrical section, while the water travels down the funnel shaped sections.

Kuryluk U.S. Pat. No. 5,564,574 describes a separator for separating materials of different specific gravities, including materials of non-uniform size. That system employs a rotating agitator as a primary means of imparting rotational energy to the materials being processed. It also depends on separate injection of water and separate chambers for mixing and dilution.

It is the object of the present invention to provide a hydrocyclone which provides improved separation of oil and water, while also being capable of removing solids.

SUMMARY OF THE INVENTION

The present invention in its broadest aspect relates to a cyclone separator comprising a generally cylindrical first portion with an open end and a closed end. A generally axial overflow outlet is provided in the closed end and a moveable member is associated with this closed end having a plurality of orifices of progressively smaller diameter than the overflow outlet. This moveable member may be moved such that any selected one of the plurality of orifices may be axially aligned with the overflow outlet. The separator includes at least two radially balanced feed injection ports in the cylindrical first portion adjacent to closed end thereof. A converging tapered second section with open ends is axially flow connected to the open end of the cylindrical first portion and a converging tapered third portion with open ends is axially flow connected to the tapered second portion. A fourth generally cylindrical portion is axially flow connected to the third tapered portion.

The separator of the invention preferably utilizes two, three or four radially balanced feed injection ports in the cylindrical first portion adjacent the closed end thereof. These injection ports are tangentially mounted so as to provide a rapidly rotating vortex under low-shear conditions. The balance propulsion forces thus generated provide improved stability of the resulting vortex, reduced turbulent energy loss and enhanced separation efficiency.

The multiple orifices system comprises a plurality of orifices of different diameters in a plate which is movably mounted on the end of the cylindrical first portion. Preferably, this plate is rotatably mounted such that it can be actuated by a powered assembly.

Another unique feature of the present invention is a cooperating means for removing particulate material in the feed stream. This is accomplished by arranging the fourth generally cylindrical portion as a pair of radially aligned tubes with an axial gap therebetween. This gap is in turn enclosed by an outer tubular portion providing an annular flow chamber connected to a discharge outlet. Because of the centrifugal forces within the fourth generally cylindrical portion, the denser particulate material travelling along the outer wall of the cylindrical portion passes through the gap between the tubes and into the annular chamber to be discharged through the discharge outlet. The water in the cylindrical portion does not tend to pass through the gap but instead continues on down through the second tubular portion for discharge.

BRIEF DESCRIPTION OF THE DRAWINGS

A presently preferred embodiment of the cyclone separator of the present invention will now be described in conjunction with the accompanying drawings, in which:

FIG. 1 is an elevational view, partly in cross section of a separator according to the invention;

FIG. 2 is an enlarged portion of the embodiment of FIG. 1;

DESCRIPTION OF THE PREFERRED EMBODIMENTS

Figure 3:
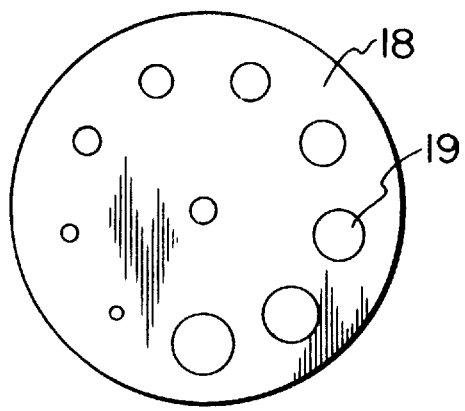
FIG. 3 is an end elevation of an orifice plate.

As seen in FIGS. 1 and 2, the hydrocyclone assembly of the invention includes a generally cylindrical first portion or involute 10, a first tapered section 11 axially aligned with the involute 10, a second tapered section 12 axially aligned with section 11 and a tubular barrel 13 axially aligned with tapered section 12. Connected to the end of tubular barrel 13 is a water collection tube 14.

The involute 10 includes a body portion 15 with a closed end wall 16. An orifice 17 is located axially in the end wall 16. The involute section 10 also includes a plurality (two, three or four) feed injection ports 25 which are tangentially mounted and equally spaced around the circumference of the involute section 10.

Figure 4:
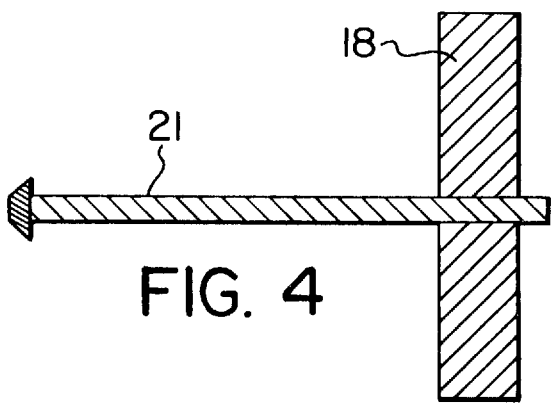
FIG. 4 is a partial sectional view of an orifice plate.
Figure 5:
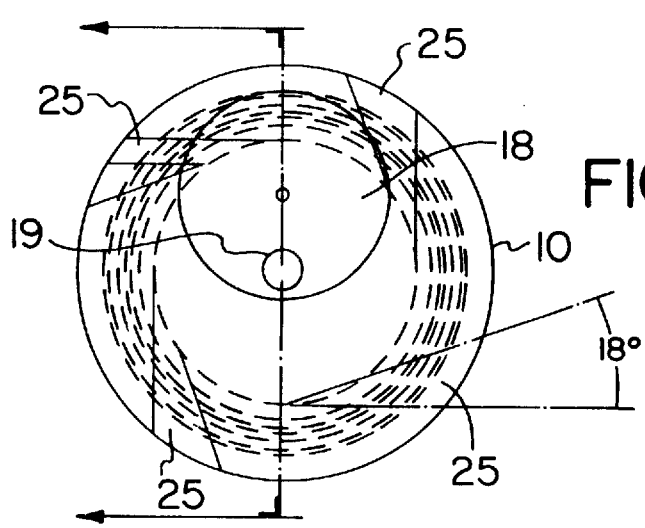
FIG. 5 is an end elevation of the closed end of the hydrocyclone.
Figure 6:
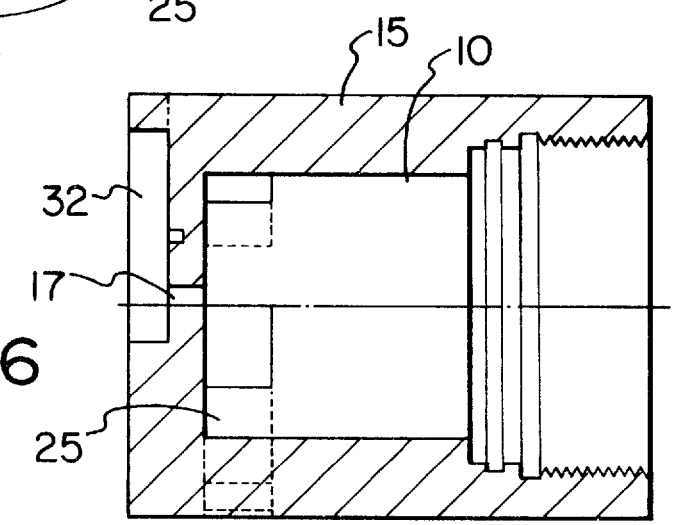
FIG. 6 is an elevational view in cross section showing the cylindrical first portion.

When a feedstock containing oil and water is fed through inlet 24 and injection ports 25, a rapidly rotating vortex is formed under low-shear conditions. The centrifugal forces generated by the vortex act differently on the denser (water) phase and the less-dense (oil) phase such that the oil phase is displaced toward the central axis of the cyclone and forms a reverse flow towards the overflow orifice 17. Because it has been found advantageous to be able to adjust the size of the orifice 17 depending on the nature of the feedstock to optimize separation, a further feature of the present invention is a system for adjusting the effect orifice size. This is accomplished by means of a rotatable plate 18 (as shown in FIGS. 3 and 4) having a plurality of orifices of different size 19. This plate 18 can be rotated either manually or by means of a power unit 20 via drive shafts 21. By this power means, any selected one of the orifices 19 in rotatable plate 18 is brought into axially alignment with orifice 17 to thereby effectively change the diameter of the orifice 17.

The first tapered section 11 includes a body portion 29 screw connected to the body portion 15 of the involute 10. Surrounding these is an outer wall 27 through which the inlet 24 passes and to which is connected a flange plate 28. The body portion 29 also has a flange plate 30 which is connected to flange plate 28.

The second tapered section 12 is screw connected to the body portion 29 of the first tapered section 11 and this in turn is connected to the water barrel or tube 13 by means of connector assembly 31.

Figure 7:
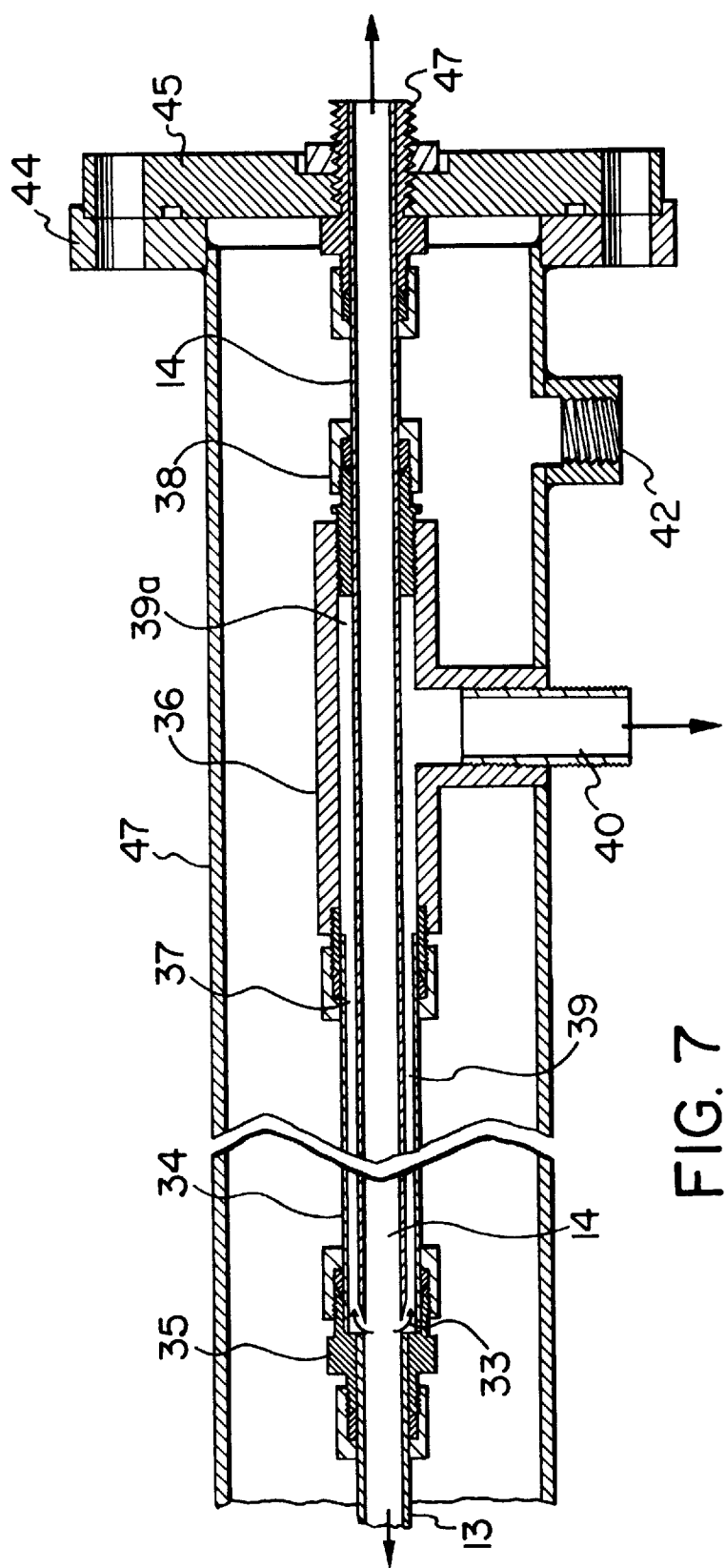
FIG. 7 is an elevational view in cross section showing an outer casing and water jacket assembly.

At the downstream end of barrel 13 is a further assembly for separating solid particles from the water being carried down barrel 13. This includes a water collection tube 14 which is axially spaced from the end of barrel 13 by a gap 33 as best seen in FIG. 7. The barrel 13 and tube 14 are held in this spaced relationship by means of an outer tube 34, a T-assembly 36 and connector flanges 35, 37 and 38. This arrangement provides an annular chamber 39 surrounding the gap 33 and surrounding tube 13. Since the density of the solids is greater than that of water, the solids tend to migrate to the outer edges of the vortex flow in barrel 13 so that when it reaches the gap 33, the particles tend to pass through the gap and into the annular chamber 39 while the bulk of the water continues to flow into the water collection tube 14, with the solids being collected at outlet 40. The water, free of particles and oil discharges through outlet 47.

It is possible to enhance the separation by heating the liquids being processed, thereby reducing the viscosity of the oil and increasing separation efficiency. This heat can be provided by means of a heating jacket formed by outer shell 41, having an inlet port 42 and an outlet port 43 for heating liquids. The downstream end of the outer shell 41 is connected to a flange 44, which in turn connects to a flange 45 which holds the outer end of the water collection tube 14.

I claim:

1. A cyclone separator comprising a generally cylindrical first portion with an open end and a closed end, a generally axial overflow outlet in said closed end, a moveable member associated with said closed end said moveable member having a plurality of orifices of progressively smaller diameter than the overflow outlet, said moveable member being moveable such that any selected one of said plurality of orifices is axially aligned with said overflow outlet, at least two radially balanced feed injection ports in said cylindrical first portion adjacent the closed end thereof, a converging tapered second portion with open ends axially flow connected to the open end of the cylindrical first portion, a converging tapered third portion with open ends axially flow connected to said tapered second portion and a fourth generally cylindrical portion axially flow connected to said tapered third portion.

2. A separator according to claim 1 having 2, 3 or 4 radially balanced feed injection ports.

3. A separator according to claim 2 wherein the fourth generally cylindrical portion comprises a pair of radially aligned tubes with a gap therebetween, said gap being enclosed by an outer tubular portion providing an annular flow chamber and a discharge outlet associated with said annular chamber whereby solid particles carried in a liquid stream travelling through said fourth generally cylindrical portion are removed through said gap and discharge outlet.

4. A separator according to claim 2 wherein said plurality of orifices are provided in a plate rotatably mounted on the closed end of said cylindrical first portion.

5. A separator according to claim 4 wherein the plate is rotated by powered assembly.

6. A separator according to claim 1 which includes an outer casing forming a heating chamber surrounding the cyclone.

* * * * *